SATURABLE REACTOR TUNING SYSTEM

Filed Dec. 2, 1958

INVENTOR.
SAMUEL H. COLODNY
BY
Fordyce A. Bothwell
ATTORNEY

United States Patent Office 2,976,412
Patented Mar. 21, 1961

2,976,412

SATURABLE REACTOR TUNING SYSTEM

Samuel H. Colodny, Levittown, Pa., assignor to Philco Corporation, Philadelphia, Pa., a corporation of Pennsylvania Filed Dec. 2, 1958, Ser. No. 777,764

9 Claims. (Cl. 250—40)

This invention relates to signal receiver tuners of the saturable reactor type, and more particularly to the prevention of deleterious effects of residual magnetism in such tuners.

As is well known, a saturable reactor tuning device comprises a magnetic core, a signal winding whose inductance is varied by variation of the magnetic flux in said core, and a control winding to which variable direct current is supplied to vary the flux in said core. For accurate tuning it is essential that the magnetic flux in said core shall be determined by the magnitude of the control current. When the tuning proceeds in the direction of higher control current, the magnetic flux at any instant is determined by the magnitude of the control current; but when the direction of tuning is reversed the magnetic flux at any instant is determined not only by the magnitude of the control current but also by the residual magnetism due to hysteresis which tends adversely to affect the tuning.

In the past the practice has been to use in the magnetic core only those materials having a low residual magnetic field, i.e. a narrow hysteresis loop. However, such materials are more expensive than those having appreciable residual magnetism, and furthermore even the best of such materials have some residual magnetism.

The principal object of the present invention is to provide a saturable reactor tuning arrangement which makes possible the use of core materials having appreciable residual magnetism, while preventing adverse effect of such magnetism upon the tuning.

In accordance with this invention, provision is made for causing the tuning always to proceed along substantially the same magnetization curve in the direction of increasing control current. More particularly, provision is made for momentarily applying reverse current to the control winding of the reactor before each application of lower tuning control current, thereby causing the magnetic material of the core to traverse its hysteresis loop. Then the subsequently applied lower tuning control current is effective to produce the required magnetic flux for proper tuning to the desired station. Preferably the reverse current is sufficient to drive the magnetization of the core substantially to negative saturation, thereby to insure that the tuning always proceeds along substantially the same magnetization curve. In this way it is assured that the tuning flux will always bear the same relation to the tuning control current.

The invention may be fully understood from the following detailed description with reference to the accompanying drawing, wherein Fig. 1 is a diagrammatic illustration of one embodiment of the invention in association with a receiver employing saturable reactor tuning;

Figures 1, 2, 3:
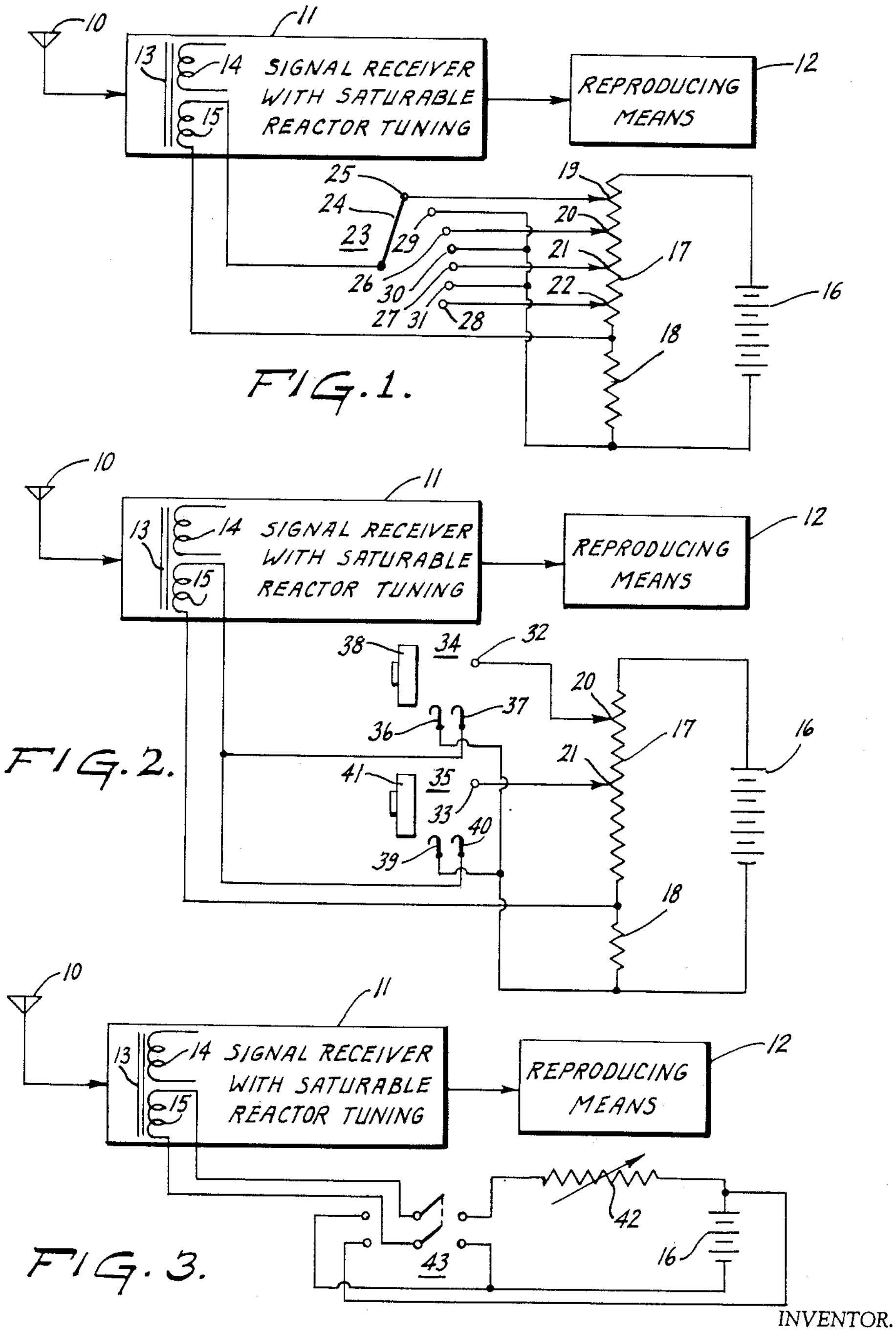
Fig. 2 is a similar illustration of another embodiment of the invention.
Fig. 3 is a similar illustration of still another embodiment of the invention.

Referring first to Fig. 1, for the present purpose it suffices to represent in a very general way a signal receiver employing saturable reactor tuning, since such receivers are well known and the present invention is not concerned with the details thereof. Accordingly there is represented a receiving antenna 10, a signal receiver 11 employing saturable reactor tuning, and a reproducing means 12. In the receiver 11, there is represented a saturable reactor tuning device comprising a magnetic core 13 having appreciable residual magnetism, a signal winding 14 whose inductance is varied by varying the magnetic flux in the core 13, and a control winding 15 to which variable direct current is supplied to vary the flux in the core. Of course, in practice there will usually be two or more saturable reactor tuning units having their control windings connected to a common control circuit. For example, in a superheterodyne receiver there may be tuning units for the R.F. and oscillator stages. For the present purpose, however, the single unit shown may be regarded as representative of the entire tuning means of the receiver.

Variable control current is supplied to the control winding 15 from a direct current source 16 represented as a battery. In the embodiment of Fig. 1, two resistors 17 and 18 are serially connected across source 16, and resistor 17 has preset taps 19 to 22 forming a voltage divider. A selector switch 23 is shown as comprising a movable contact 24, a first plurality of stationary contacts 25 to 28, and a second plurality of stationary contacts 29 to 31, the two sets of stationary contacts being arranged in alternate relation. The first contacts 25 to 28 are connected respectively to the taps 19 to 22. The second contacts 29 to 31 are connected together and to the lower end of resistor 18. The control winding 15 has one end connected to the movable contact 24 and has its other end connected to the junction between resistors 17 and 18.

In this embodiment, each of the preset taps 19 to 22 represents a broadcast station to which the receiver may be tuned by the positioning of movable contact 24 on one of the stationary contacts 25 to 28. With the movable contact on any of said stationary contacts, a voltage is applied to the control winding 15 of such polarity that the current in said winding is in the positive direction for positive magnetization of the core 13, thereby to control the inductance of the signal winding 14. When the movable contact is moved from any of said stationary contacts to the next lower one of said contacts, the applied voltage is decreased and the current is decreased accordingly. Were it not for the arrangement provided by this invention, the residual magnetism of core 13 would adversely affect the tuning. However, with the arrangement shown, when the movable contact is moved as stated it momentarily engages one of ahe contacts 29 to 31, with the result that the upper end of winding 15 is momentarily connected to the lower end of resistor 18. It will be seen that this causes application to winding 15 of a voltage of reverse polarity and thus causes a reverse current to flow in said winding. This causes the magnetic material of core 13 to traverse its hysteresis loop. Thereafter the lower control current supplied to the control winding 15 is effective to establish the inductance of the signal winding 14 for proper tuning to the desired station.

With this arrangement, therefore, when the tuning from one station to another is in the direction of lower control current supplied to the saturable reactor tuning means, the magnetism of the core material is brought to the point of zero current on the rise side of its hysteresis loop, and then the lower control current is applied and is able to establish the required lower control flux in the core 13 for proper tuning.

As previously mentioned, the reverse current is preferably sufficient to drive the magnetization of core 13 substantially to negative saturation so as to insure that the tuning always proceeds along substantially the same magnetization curve. This simply involves the provision of sufficient ampere turns to produce the desired result. In other words, the voltage across resistor 18, and consequently the reverse current, is such in relation to the number of turns of winding 15 as to produce the desired result.

It will be noted that in the arrangement of Fig. 1, the above-described reversal of current also takes place when the tuning is in the direction of higher control current. This is merely incidental to the particular arrangement and while it is not necessary, it has no adverse effect.

It will be apparent that the system of Fig. 1 can be modified as to the switching means. For example, the switching means may comprise selectable push-button switches. The simple illustration in Fig. 2 will serve to demonstrate this. By way of example, only the taps 20 and 21 are shown and they are connected respectively to stationary contacts 32 and 33 of push-button switches 34 and 35. Push-button switch 34 comprises spring contact fingers 36 and 37 engageable by the movable contact 38. Push-button switch 35 likewise comprises similar elements 39 to 41. The conventional latching and releasing mechanism may be employed to latch each push-button and to release a previously actuated push-button. Contact fingers 36 and 39 are connected to the lower end of resistor 18. Contact fingers 37 and 40 are connected to the upper end of the control winding 15. Otherwise the system is similar to Fig. 1.

When one of the push-button switches is actuated, the same result is achieved as in Fig. 1. For example, when the switch 34 is actuated, the movable contact 38 momentarily engages both of the spring contact fingers 36 and 37 to supply reverse current to the control winding 15 and thereby produce the result hereinbefore described. Then the movable contact leaves finger 36 and completes the control circuit through contacts 32 and 37, whereupon the desired tuning control current is supplied to the winding 15.

Referring now to Fig. 3, there is shown another embodiment of the invention wherein, instead of provision for selective tuning to predetermined stations, provision is made for tuning to any station within the reception band. In this instance, tuning is performed by means of a variable resistor 42 through which variable control current is supplied to the control winding 15 from source 16. Increasing the resistance decreases the control current, and conversely decreasing the resistance increases the control current. A two-pole double-throw switch 43 is provided as shown and is normally closed in the right-hand position. When the user wishes to tune in the direction of lower control current, he first adjusts resistor 42 for minimum current, and then he momentarily actuates the switch 43 to the left-hand position to supply reverse current to the winding 15, thereby producing the result hereinbefore described. Then the user adjusts resistor 42 to supply increasing current to winding 15 until the receiver is tuned to the desired station. Obviously the switch 43 may be in the form of a push-button switch spring biased to its normal position and depressable to effect the momentary current reversal.

From the foregoing description, it will be seen that the present invention has provided a novel system for saturable reactor tuning which enables the use of core materials having appreciable residual magnetism by virtue of the provision for causing the material to traverse its hysteresis loop whenever the tuning is in the direction to supply lower control current to the saturable reactor tuning means.

While certain embodiments of the invention have been illustrated and described, it will be understood that the invention is not limited thereto but contemplates such modifications and further embodiments as may occur to those skilled in the art.

I claim:

1. In combination with signal receiver tuning means including at least one saturable reactor having a magnetic core wherein residual magnetism tends adversely to affect the tuning when proceeding in the direction of lower control current supplied to the reactor, means for supplying variable control current to the reactor to tune the receiver for reception of different signals, and means for supplying reverse current to the reactor before each application thereto of tuning control current of lower amplitude, the reverse current being sufficient to cause the subsequent tuning to proceed along substantially the same magnetization curve in the direction of increasing control current and thus prevent adverse effect of residual magnetism upon the tuning.

2. In combination with signal receiver tuning means including at least one saturable reactor having a magnetic core wherein residual magnetism tends adversely to affect the tuning when proceeding in the direction of lower control current supplied to the reactor, means for supplying variable control current to the reactor to tune the receiver for reception of different signals, and means for supplying to the reactor, before each application thereto of tuning control current of lower amplitude, reverse current of sufficient magnitude to drive the magnetization of said core substantially to negative saturation, thereby to prevent adverse effect of residual magnetism upon the tuning.

3. In combination with signal receiver tuning means including at least one saturable reactor having a magnetic core wherein residual magnetism tends adversely to affect the tuning when proceeding in the direction of lower control current supplied to the reactor, a source of unidirectional voltage, means including a voltage divider for applying different voltages to said reactor from said source, thereby to supply variable control current to the reactor to tune the receiver for reception of different signals, and means for supplying reverse current to the reactor from said source before each application to the reactor of tuning control current of lower amplitude, the reverse current being sufficient to cause the subsequent tuning to proceed along substantially the same magnetization curve in the direction of increasing control current and thus prevent adverse effect of residual magnetism upon the tuning.

4. In combination with signal receiver tuning means including at least one saturable reactor having a magnetic core wherein residual magnetism tends adversely to affect the tuning when proceeding in the direction of lower control current supplied to the reactor, a source of unidirectional voltage, means for connecting said source to said reactor to supply control current to the latter, variable resistance means in circuit with said source for varying said control current to tune the receiver for reception of different signals, and means for supplying reverse current to the reactor from said source before each application to the reactor of tuning control current of lower amplitude, the reverse current being sufficient to cause the subsequent tuning to proceed along substantially the same magnetization curve in the direction of increasing control current and thus prevent adverse effect of residual magnetism upon the tuning.

5. In combination with signal receiver tuning means including at least one saturable reactor having a magnetic core wherein residual magnetism tends adversely to affect the tuning when proceeding in the direction of lower control current supplied to the reactor, a source of unidirectional voltage, selector switch means including a first plurality of selectable contacts and a second plurality of selectable contacts, circuit means controlled by said first contacts for supplying variable control current to said reactor from said source to tune the receiver for reception of different signals, and circuit means controlled by said second contacts for supplying reverse current to said reactor from said source before each application to the reactor of lower tuning control current, the reverse current being sufficient to cause the subsequent tuning to proceed along substantially the same magnetization curve in the direction of increasing control current and thus prevent adverse effect of residual magnetism upon the tuning.

6. A system according to claim 5, wherein said selector switch means comprises a rotary selector switch in which said second contacts are interposed between said first contacts.

7. A system according to claim 5, wherein said selector switch means comprises a plurality of push-button switches in which the current reversal is effected in the course of push-button travel.

8. In combination with signal receiver tuning means including at least one saturable reactor having a magnetic core wherein residual magnetism tends adversely to affect the tuning when proceeding in the direction of lower control current supplied to the reactor, a source of unidirectional voltage, selector switch means including a first plurality of selectable contacts and a second plurality of selectable contacts, a voltage divider connected to said source and having taps selectable by said first contacts to supply control current to said reactor from said source to tune the receiver for reception of different signals, and circuit means controlled by said second contacts for supplying reverse current to said reactor from said source before each application to the reactor of lower tuning control current, the reverse current being sufficient to cause the subsequent tuning to proceed along substantially the same magnetization curve in the direction of increasing control current and thus prevent adverse effect of residual magnetism upon the tuning.

9. In combination with signal receiver tuning means including at least one saturable reactor having a magnetic core wherein residual magnetism tends adversely to affect the tuning when proceeding in the direction of lower control current supplied to the reactor, a source of unidirectional voltage, means for connecting said source to said reactor to supply control current to the latter, variable resistance means in circuit with said source from varying said control current to tune the receiver for reception of different signals, and means including a reversing switch for supplying reverse current to said reactor from said source before each application to the reactor of lower tuning control current, the reverse current being sufficient to cause the subsequent tuning to proceed along substantially the same magnetization curve in the direction of increasing control current and thus prevent adverse effect of residual magnetism upon the tuning.

References Cited in the file of this patent

UNITED STATES PATENTS

| | | |
|---|---|---|
| 2,255,915 | Kramolin | Sept. 16, 1941 |
| 2,581,202 | Post | Jan. 1, 1952 |
| 2,810,826 | Hargens | Oct. 22, 1957 |
| 2,915,625 | Worcester | Dec. 1, 1959 |

OTHER REFERENCES

Article, "The Wobbley Oscillator" in "The Wireless World," August 11, 1938, pages 112–114.